United States Patent [19]
Holt

[11] Patent Number: 5,405,168
[45] Date of Patent: Apr. 11, 1995

[54] COMBINATION COMPUTER MOUSE PAD AND NOTE PAD

[76] Inventor: G. Gary Holt, P.O. Box 478, Morristown, Tenn. 37815-0478

[21] Appl. No.: 184,378

[22] Filed: Jan. 21, 1994

[51] Int. Cl.⁶ .................................................. B42D 1/00
[52] U.S. Cl. ............................................ 281/2; 281/51
[58] Field of Search .................. 281/2, 5, 6, 12, 38, 281/51, 13, 3.1

[56] References Cited

U.S. PATENT DOCUMENTS

| | | | |
|---|---|---|---|
| H377 | 12/1987 | Greig | 281/2 |
| 2,132,121 | 10/1938 | Nudelman | 281/51 |
| 4,884,826 | 12/1989 | Slagsvol | 281/2 |
| 4,907,824 | 3/1990 | Smirnoff | 281/51 |
| 5,011,186 | 4/1991 | Bodziak et al. | 281/2 |
| 5,022,170 | 6/1991 | House | 40/358 |
| 5,131,614 | 7/1992 | Garcia et al. | 248/118 |
| 5,217,781 | 6/1993 | Kuipers | 428/85 |
| 5,228,655 | 7/1993 | Garcia et al. | 248/118 |

*Primary Examiner*—Hwei Siu Payer
*Attorney, Agent, or Firm*—Pitts & Brittian

[57] ABSTRACT

A combination computer mouse pad and note pad for providing a work surface upon which notes can be written and a computer mouse can be operated. The combination computer mouse pad and note pad includes a plurality of sheets of paper which are secured together in a manner such that the paper does not come up or move while a computer mouse is dragged across the surface of the top sheet. The combination computer mouse pad and note pad defines a means for assisting in separating and removing the top sheet.

4 Claims, 1 Drawing Sheet

COMBINATION COMPUTER MOUSE PAD AND NOTE PAD

TECHNICAL FIELD

This invention relates to the field of computer mouse pads, and more specifically, a computer mouse pad which provides a surface upon which notes can be written.

BACKGROUND ART

Computer mouse pads have become a necessity to individuals who use a computer with a mouse. A computer mouse has a track ball at the bottom which touches contacts within the mouse. As the track ball is moved, specific contacts are triggered, and subsequently the movement of the pointer on the screen is controlled. To use a mouse effectively, the linear movement of the mouse across a surface must be accurately translated to the rotational movement of the track ball. This can be frustrated if the surface is not sufficient to maintain the friction necessary to contact the track ball at all times. A mouse pad is used to maintain the friction necessary to control the track ball such that the track ball does not slip.

A problem with mouse pads is that they take up precious space on a desk already crowded with a computer and other computer accessories. Often, a user, who is taking notes, must place the note pad in his lap or in some other inconvenient position to take notes.

Therefore, it is an object of this invention to provide a combination computer mouse pad and note pad which provides a surface which maintains contact with a track ball of a computer mouse.

It is a further object of this invention to provide a combination computer mouse pad and note pad which provides a surface upon which notes can be taken.

It is still a further object of the present invention to provide a combination computer mouse pad and note pad which provides a plurality of sheets which are secured in a manner such that the sheets do not move and give way to the mouse.

It is another object of the present invention to provide a combination computer mouse pad and note pad which provides a means for easily pulling off the top sheet.

DISCLOSURE OF THE INVENTION

Other objects and advantages will be accomplished by the present invention which serves to provide a combination computer mouse pad and note pad. The combination computer mouse pad and note pad of the present invention includes a plurality of sheets of a selected material and a means for securing the plurality of sheets together. Each of the sheets of paper defines a work surface upon which notes can be written and a computer mouse can be operated such that the user has complete control the cursor on the computer screen. The plurality of sheets are secured such that sheets of paper do not come up or move while dragging the computer mouse across the combination computer mouse pad and note pad. Further, the combination computer mouse pad and note pad provides a means for facilitating the removal of each sheet individually.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 1A:
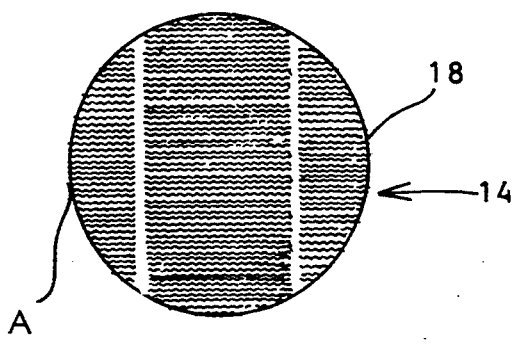
FIG. 1A is an enlarged detail showing the texture of the work surface of FIG. 1; and, FIG. 2 is a side view of the combination computer mouse pad and note pad of FIG. 1.

A combination computer mouse pad and note pad incorporating various features of the present invention is illustrated generally at 10 in the figures. The combination computer mouse pad and note pad 10 is designed to provide work surface upon which a computer mouse can be operated and notes can be written. Moreover, in the preferred embodiment, the combination computer mouse pad and note pad 10 is comprised of a plurality of sheets of a selected material which define a selected configuration. The plurality of sheets are secured in a manner to prevent the sheets from moving when the mouse is pulled across the pad 10. Further, the combination computer mouse pad and note pad 10 provides a means for facilitating the removal of the plurality of sheets individually.

The combination computer mouse pad and note pad 10 is generally comprised of a plurality of sheets of a selected material 12 and a means 20 for securing the plurality of sheets 12, one to another. In the preferred embodiment, each of the plurality of sheets 12 defines a selected configuration with at least two opposing edges 16. Further, preferably, the combination computer mouse pad and note pad 10 also includes a base 30 to which the plurality of sheets 12 are secured.

In the preferred embodiment, the selected material from which each of the plurality of sheets 12 is fabricated is textured paper, detailed view of the texture is shown in FIG. 1A. The paper must have sufficient texture 18 to establish at least the minimum coefficient of friction necessary to continuously contact the track ball 34 of a computer mouse 32. In this manner, the user has continuous control of the cursor on the computer screen.

In the preferred embodiment, the textured paper is 70 pound, CLASSIC (registered) Laid Text Paper with a number one laid text of premium sulphite providing a true laid finish. A cotton fiber paper machine is utilized in the production of CLASSIC laid. Its slower speed and smaller size allows the fibers to interlock, providing the optimum surface for the special dandy roll to inpart the random laid finish while maintaining consistent product color.

It will be noted that bond paper is insufficient because it does not possess the machine laid finish of laid text. The machine laid finish is necessary to establish a sufficient coefficient of friction between the track ball 34 and the work surface 14 provided by the paper 12 to consistently move the track ball 34 as the computer mouse 32 is pulled across the paper 12.

Figure 1:
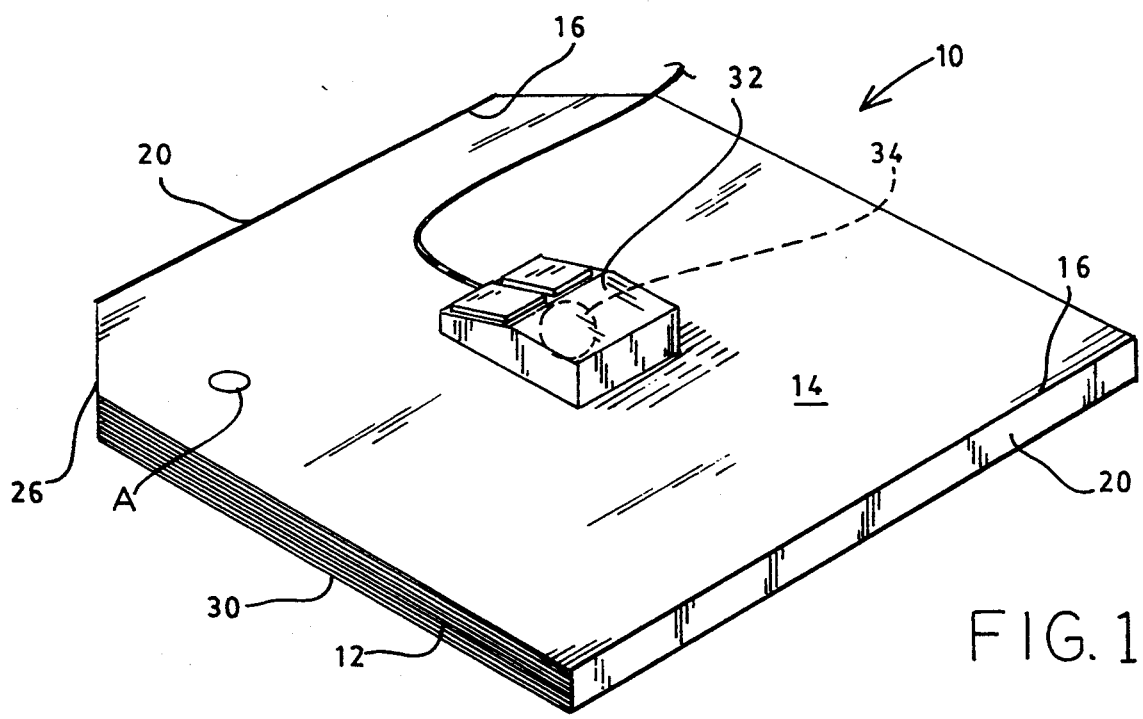
FIG. 1 is a perspective view of the combination computer mouse pad and note pad constructed in accordance with several features of the present invention.

Preferably, the texture 18 runs from side to side, as depicted in FIG. 1. With the texture 18 running from side to side, a work surface 14 is provided which is more conducive to writing upon. It will be noted that the work surface 14 provided is a rough writing surface upon which notes can be written but is not intended to provide a writing surface upon which notes can be neatly written. It will also be noted that after an extended amount of use the texture 18 will flatten such that the contact between the track ball 34 and the work surface 14 is not continuous. At this point the top sheet of the combination mouse pad and note pad 10 should be removed to reveal a new sheet of textured paper 12.

While a preferred embodiment of the type of textured paper and the process for manufacturing the textured paper has been described, it will be understood that it is not intended to limit the type of paper used. It is intended to cover alternate embodiments which provide a work surface with a sufficient coefficient of friction to move a track ball and upon which notes can be taken.

Figure 2:
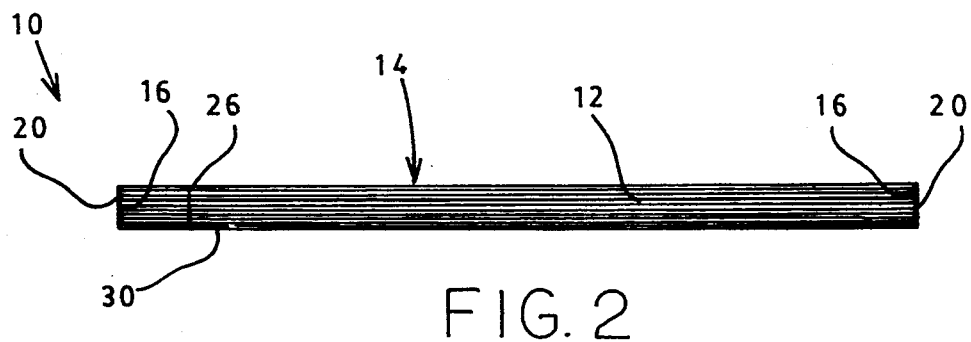

The plurality of sheets 12 are secured, via securing means 20, such that the sheets 12 will not move or come up as the computer mouse 32 is pulled across the combination computer mouse pad and note pad 10. Of course, the securing means must be such that the sheets can be removed individually from the combination mouse pad and note pad 10. In the preferred embodiment, the plurality of sheets 12 are secured at the opposing edges 16 with adhesive glue strips, as shown FIGS. 1 and 2. Most preferably, the opposing edges 16 are at the top and bottom of the combination pad 10.

It will be noted that in an alternate embodiment, the securing means can be an adhesive applied to the back of each sheet of paper either over the entire sheet or at certain points. The adhesive must be adhere the sheets to each other in a manner such that the sheets can be removed individually. The adhesive must not leave a film on the sheet to which it is secured because the adhesive will gum up the track ball. It is also envisioned that the selected configuration of each sheet is not limited to a square or rectangular shape and can be circular or triangular, for example. In varying selected configurations, the plurality of sheets must be secured to each other in a manner such that sheets do not come up or move when operating a computer mouse on the work surface.

In the preferred embodiment, the plurality of sheets 12 are secured to a base 30. Preferably, the base 30 is fabricated of hard chip board. The base 30 supports the plurality of sheets 12 and provides the combination pad 10 with stiffness. The base 30 also provides friction between a support surface and the base 30 such that the combination pad 10 stays in place while being used.

It is preferable that the height of the pad not exceed approximately a half of an inch (½") or approximately forty sheets of the textured paper described.

In the preferred embodiment, the combination computer mouse pad and note pad 10 includes a means for assisting in the removal of the top sheet from the pad 10 individually. The preferred method is to cut at least one of corners of the pad 10 thereby providing an free edge 26, which is not secured such that the top sheet can be individually lifted and torn off. In the preferred embodiment, both the left and right upper corners are cut at 45° angles to provide free edges 26, as shown in FIG. 1. Both corners reveal free edges 26 such that the combination pad 10 can be conveniently used by a right-handed or left-handed person.

From the foregoing description, it will be recognized by those skilled in the art that a combination computer mouse pad and note pad offering advantages over the prior art has been provided. Specifically, the combination computer mouse pad and note pad provides a work surface upon which a computer mouse can be operated and notes can be written. Moreover, the combination computer mouse pad and note pad is comprised of a plurality of sheets of textured paper which are secured such that they do not move or come up as the computer mouse is pulled across the top surface. Further, the combination computer mouse pad and note pad provides at least one free edge for easily separating the top sheet from the remaining sheets such that the top sheet is easily torn off the combination pad.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A combination computer mouse pad and note pad comprising:
   a plurality of sheets of textured paper, each of said plurality of sheets defining a selected configuration having a top face, a bottom face and opposing side edges, each said top face defining a work surface, said work surface being used for writing, said work surface further being used to engage a track ball of a computer mouse;
   a base defining said selected configuration of each of said plurality of sheets of textured paper, said base for supporting said plurality of sheets of textured paper; and,
   a set of adhesive glue strips for securing said plurality of sheets and base together, each strip being applied to a respective one of said opposing side edges, said selected configuration of each of said plurality of sheets defining at least one free side edge which is not secured, said at least one free side edge for separating a top sheet from said plurality of sheets such that said top sheet is easily torn off said combination computer mouse and note pad.

2. A combination computer mouse pad and note pad comprising:
   a plurality of sheets of textured papers, each of said plurality of sheets of textured paper defining a selected configuration having a top face, a bottom face and opposing side edges, each said top face defining a work surface, said work surface being used for writing, said work surface further being used to engage a track ball of a computer mouse;
   a base defining said selected configuration of each of said plurality of sheets of textured paper, said base for supporting said plurality of sheets of textured paper; and,
   securing means for securing said plurality of sheets and said base together along said opposing side edges.

3. The combination computer mouse pad and note pad of claim 2 wherein said securing means is a set of adhesive glue strips, each strip being applied to a respective one of said opposing side edges.

4. The combination computer mouse pad and note pad of claim 2 wherein said selected configuration of each of said plurality of sheets of textured paper defines at least one free side edge which is not secured, said at least one free side edge for separating a top sheet from said plurality of sheets such that said top sheet is easily torn off said combination computer mouse and note pad.

* * * * *